US008677118B1

(12) United States Patent
Liu et al.

(10) Patent No.: US 8,677,118 B1
(45) Date of Patent: Mar. 18, 2014

(54) AUTOMATED KERNEL HOOK MODULE BUILDING

(75) Inventors: Allen S. H. Liu, Taichung (TW); Eric Chao, Taipei (TW); Morris Chen, Taipei (TW)

(73) Assignee: Trend Micro, Inc., Tokyo (JP)

( * ) Notice: Subject to any disclaimer, the term of this patent is extended or adjusted under 35 U.S.C. 154(b) by 2213 days.

(21) Appl. No.: 11/047,786

(22) Filed: Feb. 1, 2005

(51) Int. Cl.
*H04L 29/06* (2006.01)

(52) U.S. Cl.
USPC ........... 713/164; 713/100; 709/219; 709/168; 709/221; 717/115; 717/168; 717/120

(58) Field of Classification Search
USPC .............. 717/174, 115, 1, 120, 168; 713/200, 713/100, 164; 714/38; 709/223, 219, 220, 709/221; 726/25, 26, 3; 707/10
See application file for complete search history.

(56) References Cited

U.S. PATENT DOCUMENTS

| | | | | |
|---|---|---|---|---|
| 6,823,460 B1* | 11/2004 | Hollander et al. | ................. | 726/3 |
| 7,222,333 B1* | 5/2007 | Mor et al. | ...................... | 717/115 |
| 7,287,281 B1* | 10/2007 | Szor | ................................. | 726/25 |
| 7,340,777 B1* | 3/2008 | Szor | ................................. | 726/26 |
| 7,379,982 B2* | 5/2008 | Tabbara | ........................ | 709/220 |
| 2002/0029374 A1* | 3/2002 | Moore | .............................. | 717/1 |
| 2002/0188939 A1* | 12/2002 | Hediger et al. | ................ | 717/174 |
| 2004/0025015 A1* | 2/2004 | Satterlee et al. | ............... | 713/164 |
| 2004/0158729 A1* | 8/2004 | Szor | ............................... | 713/200 |
| 2004/0225877 A1* | 11/2004 | Huang | ............................ | 713/100 |
| 2004/0226020 A1* | 11/2004 | Birmingham | ................. | 719/310 |
| 2005/0015675 A1* | 1/2005 | Kolawa et al. | ................... | 714/38 |
| 2005/0262227 A1* | 11/2005 | Heller et al. | ................... | 709/223 |
| 2006/0015505 A1* | 1/2006 | Henseler et al. | ................ | 707/10 |
| 2006/0031407 A1* | 2/2006 | Dispensa et al. | .............. | 709/219 |
| 2006/0123414 A1* | 6/2006 | Fors et al. | ...................... | 717/177 |
| 2007/0168955 A1* | 7/2007 | Nicol et al. | .................... | 717/120 |

OTHER PUBLICATIONS

Richard J. Moore; Generalised Kernel Hooks Interface; Jul. 1, 2001; IBM Linux Technology Centre; p. 1-18.*

* cited by examiner

*Primary Examiner* — Saleh Najjar
*Assistant Examiner* — Joseph Pan
(74) *Attorney, Agent, or Firm* — Beyer Law Group LLP

(57) ABSTRACT

Building a kernel hook module (KHM) on a build machine in an automated manner uses a script file to control the process. A user requests a KHM for a particular Linux kernel of a Linux distribution. The build machine is rebooted if necessary to run the target Linux distribution. Kernel source files for the Linux distribution are loaded and installed on the build machine. Various parameters are set and source code representing the functionality of the KHM (or that of a related software product) are loaded onto the build machine. The KHM is then built automatically under direction of the script file. A control machine receives the user request for a particular KHM over the Internet and directs operation of the build machine. A test machine tests the KHM once built. The KHM works in conjunction with anti-virus software or other software.

27 Claims, 9 Drawing Sheets

Request Form Example

TREND MICRO KHM BuildToOrder System

▲ Submit Order
▲ Query Order

Submit Order

| | |
|---|---|
| Submit Type: | ⦿ Official  ○ Customized — 312 |
| SPLX Edition: | [1.3 ▶] — 314 |
| Distribution: | [RedHat ▶] — 316 |
| Edition: | [RHEL3 ▶] — 318 |
| Kernel Version: | [2.4.21] - [15.0.3.EL] — 320 |
| CPU Type: | [i686 ▶] — 322 |
| CPU Number: | [up ▶] — 324 |
| Email Address: | [allen_liu@trend.com.tw] — 326 |

[Submit] [Cancel]

AUTOMATED KERNEL HOOK MODULE BUILDING

FIELD OF THE INVENTION

The present invention relates generally to automating a process for creating software. More specifically, the present invention relates to automating the building of a kernel hook module for the Linux operating system kernel.

BACKGROUND OF THE INVENTION

In the area of anti-virus software, it is known in the art to modify the operating system of a computer to assist with anti-virus techniques. For example, it is known to modify the kernel of an operating system to assist with the scanning of files to help detect a computer virus that might be present in a file.

FIG. 1 is an example of a prior art operating system 10 that uses a kernel hook module 30 to assist with anti-virus efforts. Operating system 10 includes user space 20 that makes system calls available for processes and kernel space 22 that includes the low-level system software. For example, user space 20 includes the commands "open," "close," "execve" and "exit" that can be used by a process running on a computer to open a file, close a file, execute a file or exit a process. Of course, other commands are available. Normally, use of a command 24 results in a system call 26 into the kernel space that directs the call to the system call table 28. Absent any modification to the kernel space 22, system call table 28 would direct an open command via pointer 32 to the actual procedure "open" 33 that would then open a file in the normal course.

In some circumstances, though, a kernel hook module (KHM) 30 is added to an operating system to intercept certain system calls. In this example, the procedures "openhook," "closehook" and "exechook" have been added via the kernel hook module to intercept and replace the normal system calls "open," "close" and "exec." In other words, the pointers in the system call table 28 are modified to redirect the system calls to the new procedures added in the kernel hook module. For example, when an "open" system call is made, pointer 32' now redirects the flow to procedure "openhook" 34 in the kernel hook module instead of to the original procedure "open" 33. The advantage is that the procedure "openhook" 34 can now provide additional functionality in addition to simply opening a file. In the anti-virus context, a KHM is added into an operating system to replace important file system calls such as open, close and exec. By doing so, the additional code in the KHM procedures can perform real-time scanning of files before the files are actually opened or closed. If a file is found to be infected with a computer virus, the additional code of the KHM can return with an error code, thus denying the user process access to that file. Thus a KHM can be used in anti-virus efforts.

Because of the interaction with kernel source code, a KHM for a specific version of a kernel must be built with that version's kernel source code in order to function properly. Unfortunately, for certain operating systems such as Linux, there are a large number of kernel versions and more are being added constantly. FIG. 2 illustrates an example of the countless number of Linux kernels in existence for a few of the better-known operating systems. Because there are so many different kernels for Linux, it is a daunting and time-consuming task to create a KHM for each kernel and to constantly create a new KHM for each new kernel version released.

The process of building a KHM for each new kernel version is tedious and time-consuming as an engineer performs this task manually. It can take upwards of one hour for an engineer to build a new KHM for a new Linux kernel. Furthermore, if even a small mistake is made during the KHM build process, the resulting KHM can cause the entire operating system to crash. Because a newly-built KHM is often delivered to numerous customers to assist with anti-virus efforts, an engineer building a KHM must be extraordinarily careful when performing the build process.

One company, Network Associates, Inc., has a Linux anti-virus software product that relies upon a KHM. The approach used by Network Associates is to provide the customer all related source code and let the customer build the KHM by themselves. This approach has a couple of drawbacks. First, the company cannot guarantee the quality of the built KHM because the end user may make a mistake during the build process. Secondly, the company cannot merge in the latest fix for the KHM unless the end user desires to update the source code by themselves. In short, there is no formal testing or quality assurance if the end user is allowed to build the KHM by themselves manually.

In view of the above, and improved technique for providing kernel hook modules to end users is desired.

SUMMARY OF THE INVENTION

To achieve the foregoing, and in accordance with the purpose of the present invention, an automated kernel hook module building process is disclosed.

The automated process uses information provided by end users having a specific kernel version to build a corresponding kernel hook module automatically. The automatic steps include fetching the kernel source and binary files, installing these files, naming the related files and folders correctly, making necessary links, adjusting the "Makefile" and choosing the correct configuration file to build the kernel header, checking out the related product source code, adjusting the source code according to the end user's request, setting environment variables, and compiling the KHM. Depending upon the particular embodiment, some of the steps might be optional or may be modified.

The present invention has numerous advantages over the prior art including providing a better quality KHM, having the ability to merge in the latest fix of the kernel hook module, saving an engineer's time and effort, allowing customers to gain access to new KHMs more quickly, and supporting real-time scanning for computer viruses for many more computing platforms.

In one specific embodiment, the automated process of the current invention benefits a software product that uses real-time scanning for computer viruses implemented in a kernel hook module. For example, the software product ServerProtect for Linux (SPLX) available from Trend Micro, Inc. of Cupertino Calif., is an example of such a software product. SPLX provides comprehensive real-time protection against computer viruses, Trojan horses and worms for Linux servers and desktops. ServerProtect allows central virus scanning, pattern updates and events reporting, and can manage virus maintenance tasks such as initiating on-demand scanning, printing/exporting/purging virus logs and setting parameters for real-time scanning. SPLX also performs kernel level scanning for viruses and malicious code to minimize performance degradation through the use of a kernel hook module.

In one alternative embodiment, the present invention automates the building of a kernel hook module that operates on its own, that is, the KHM is not part of a larger software product. In other embodiments, the KHM is part of any of a variety of other software products that perform other tasks.

In a system embodiment of the present invention, the system includes a control machine and a build machine. The control machine is in communication with the Internet and with a build machine and directs operation of the build machine. An end user submits a user request for a KHM over the Internet to the control machine that identifies a particular Linux distribution environment. The build machine is then configured to run the Linux distribution and kernel source files for that distribution environment are loaded onto the build machine. The build machine then builds the KHM in an automated manner. The resulting KHM is compatible with the Linux distribution environment and is delivered to the end user for insertion into their Linux distribution environment. A test machine (also termed a "UnitTest Machine") may also be used to test the KHM once it has been built to ensure quality.

A specific method for building the KHM on the build machine in an automated manner includes the following steps. First, the build machine is rebooted if necessary to run the appropriate Linux distribution. The kernel source files for that Linux distribution are then loaded and installed on the build machine. Various parameters are set (such as GCC compiler version, folder naming and Makefile parameters) and source code representing the functionality of the KHM (or that of a related software product) are loaded onto the build machine. The KHM is then built automatically. Preferably, the loading of files, parameters setting, and actual building of the KHM are performed under the direction of a script file so that the process is automated.

BRIEF DESCRIPTION OF THE DRAWINGS

The invention, together with further advantages thereof, may best be understood by reference to the following description taken in conjunction with the accompanying drawings in which:

FIG. 5 is an example of a web page request form.

FIG. 6 is another example of a web page request form.

DETAILED DESCRIPTION OF THE INVENTION

The present invention relates to a kernel hook module, that is, a software module inserted into the kernel of a computer's operating system. As is known in the art, the kernel of an operating system refers to the low-level system software that provides a hardware abstraction layer, disk and file system control, multi-tasking, load-balancing, networking and security enforcement. The kernel is the fundamental part of an operating system that provides secure access to the machine's hardware to various computer programs. In general, there are four broad categories of kernels: monolithic kernels, microkernels, hybrid kernels and exokernels. One example of a monolithic kernel is the Linux kernel.

A Linux kernel is a UNIX-like operating system kernel created in 1991 that continues to be improved with the assistance of developers around the world. A complete operating system built around the Linux kernel is commonly known as a Linux operating system, or also as a Linux distribution (or even as a GNU/Linux system). The present invention is applicable to any version of the Linux kernel (e.g., stable versions 1.0, 1.2, 2.0, 2.2, 2.4 and 2.6), including development versions and any future versions yet to be released. Further, any operating system based on a Linux kernel or compatible with a Linux kernel is suitable for use with the present invention.

A kernel hook is a generalized mechanism for managing exits in kernel space. A hook is a location in the kernel that calls out to a kernel hook module routine. It enables many kernel enhancements, which are otherwise self-contained, to become loadable kernel modules and retain a substantial degree of independence from the kernel source. This affords advantages for maintenance and co-existence with other kernel enhancements. Typically, hooks are implemented as insertions to kernel space code. When not active they add practically no overhead to the kernel.

System Architecture

Figure 1:
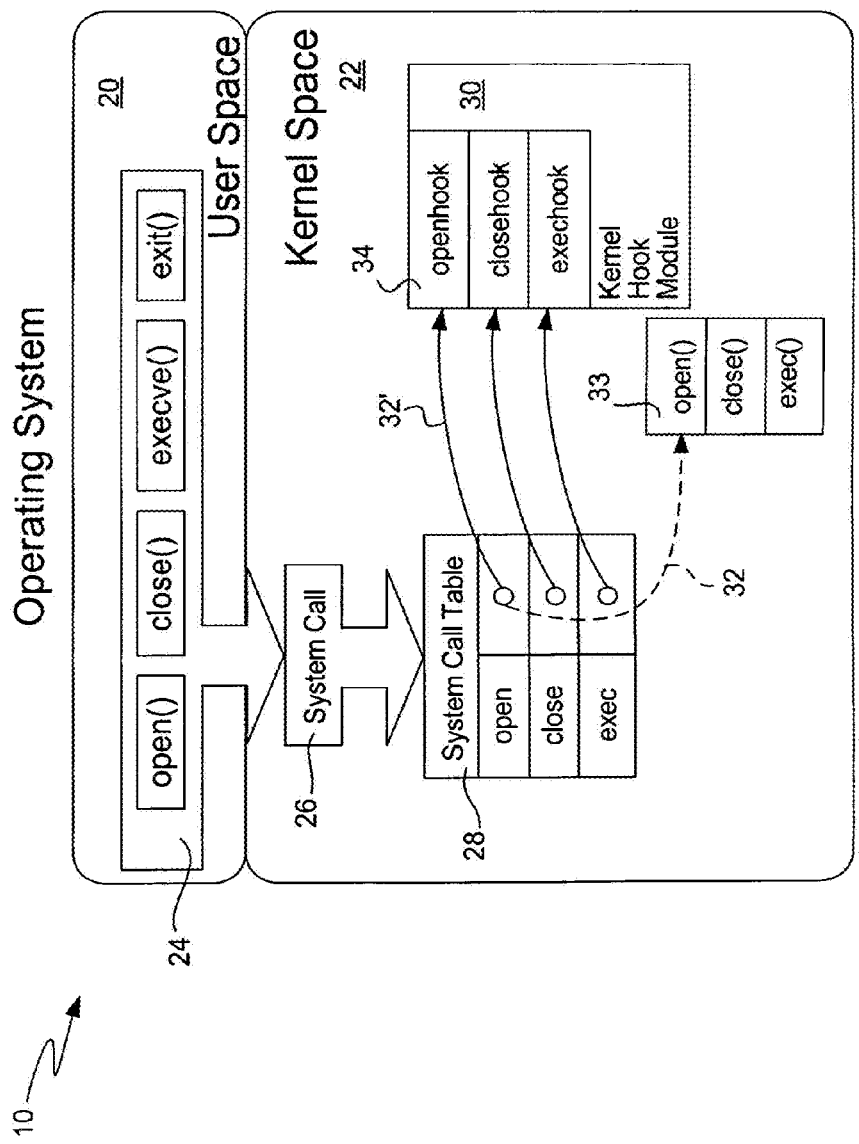
FIG. 1 is an example of a prior art operating system that uses a kernel hook module to assist with anti-virus efforts.
Figure 2:
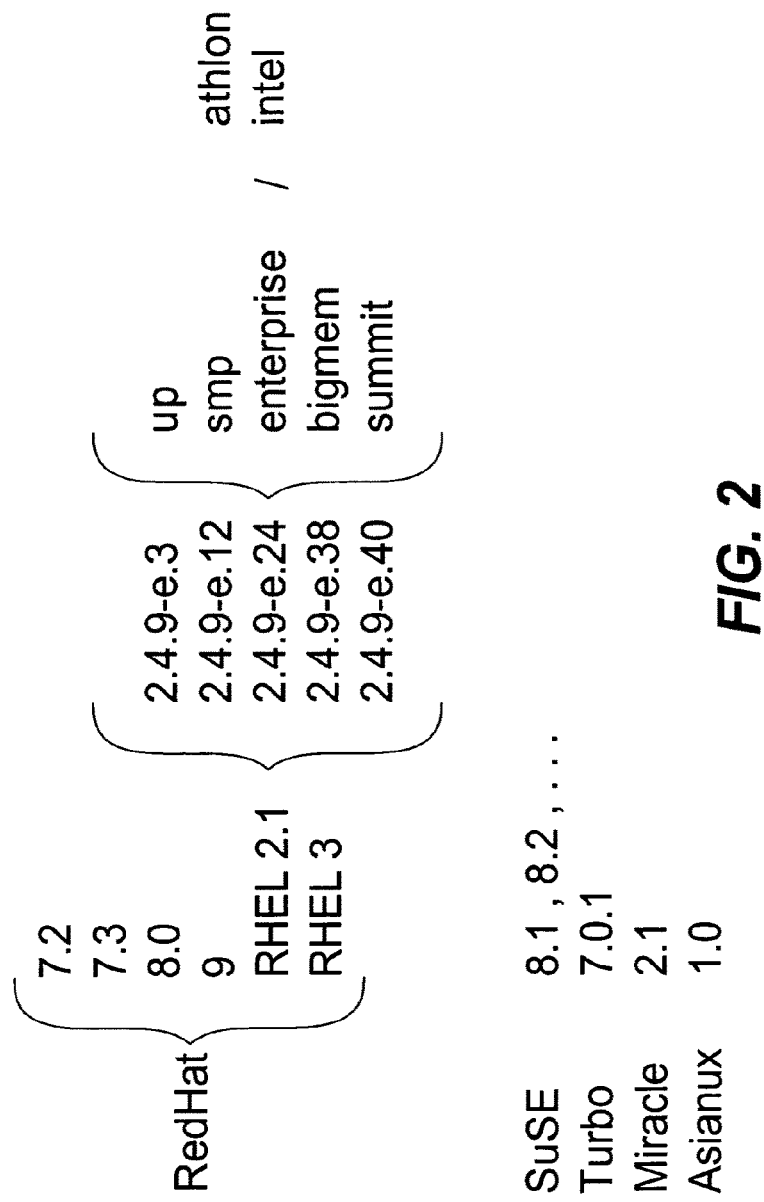
FIG. 2 illustrates an example of the number of Linux kernels in existence for a few of the better-known operating systems.
Figure 3:
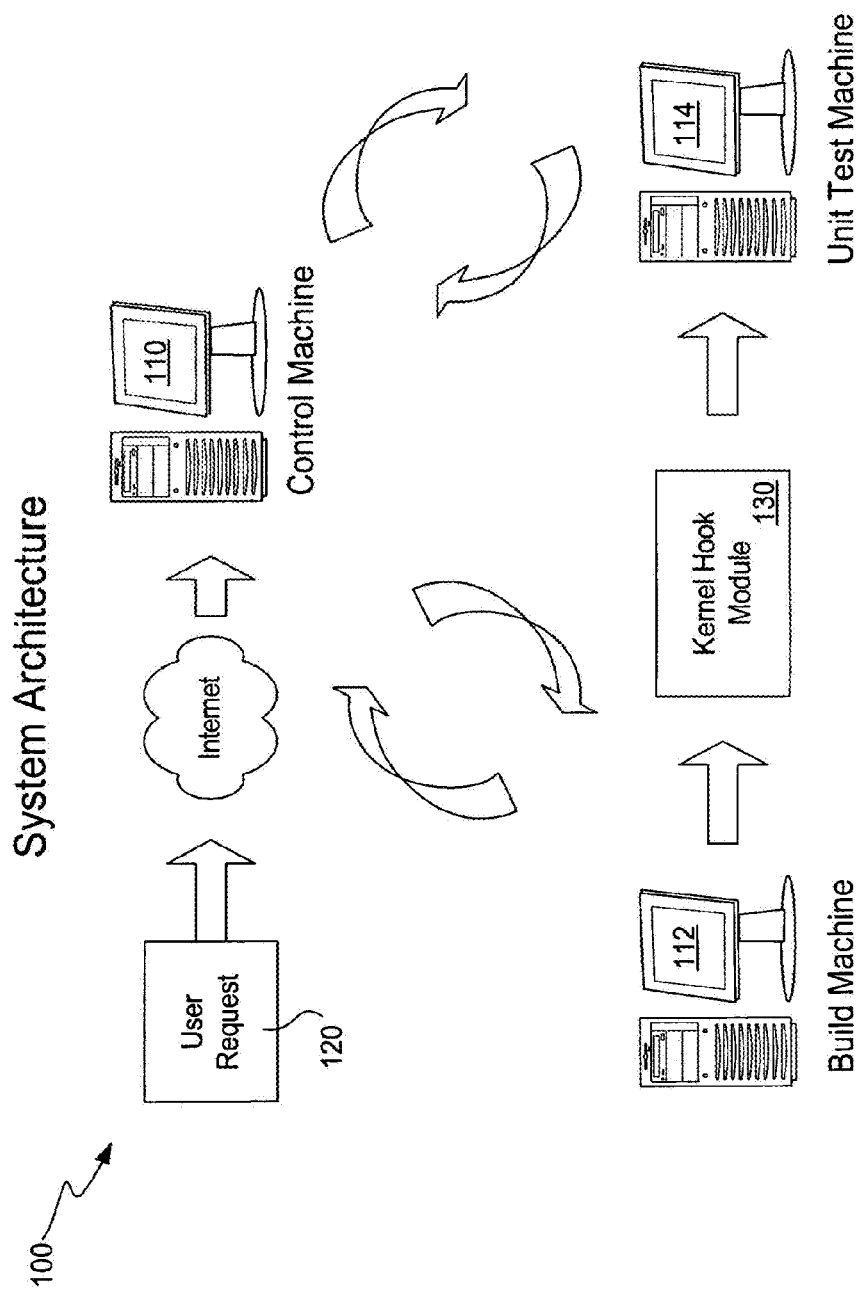
FIG. 3 is a block diagram of a system architecture suitable for implementing an embodiment of the present invention.

FIG. 3 is a block diagram of a system architecture 100 suitable for implementing an embodiment of the present invention. In this embodiment, architecture 100 includes a control machine 110, a build machine 112 and a unit test machine 114. Control machine 110 is any suitable personal computer or web server with a web interface arranged to field kernel hook module (KHM) build requests, coordinate with the other machines, direct the overall system and return a KHM to the end user. Build machine 112 is a personal computer arranged to build the KHM, and unit test machine 114 is a multiple processor personal computer arranged to perform stress and volume testing of the built KHM. Thus, the functionality of the system architecture is distributed amongst three machines in this embodiment; of course, in other embodiments the functionality may be concentrated in a single machine or distributed amongst an even greater number of machines. For example, there may be numerous build machines in order to scale up the ability to build KHMs if numerous build requests arrive at the same time.

User request 120 originates from any suitable end user who accesses the system architecture over the Internet to submit a KHM build request. An end user will typically be a company or individual which has a need for a KHM for a specific Linux kernel. A new KHM may be required because the user has changed systems, has upgraded to a new Linux version, or desires an upgraded KHM. In a preferred embodiment, firewall software sits between the control machine and both the build and test machines, and may be implemented in hardware or software. A local intranet may also be implemented to coordinate communication between the build and test machines.

System Flow Diagrams

Figure 4:
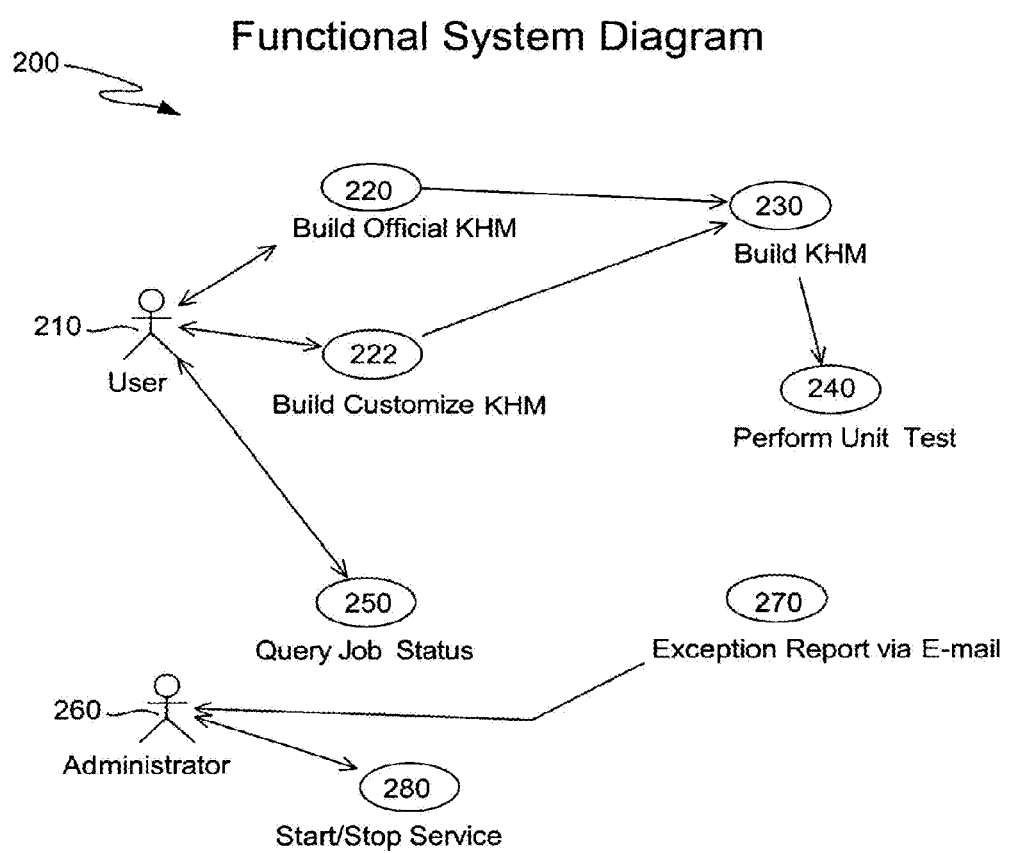
FIG. 4 is a functional system diagram reflecting the perspective of a user or a system administrator.

FIG. 4 is a functional system diagram 200 reflecting the perspective of a user 210 or a system administrator 260. A user interacting with the system over the Internet may build an official KHM 220 or build a custom KHM 222. To build an official KHM, the user first fills out a request form and submits it to the system. Preferably, the user fills out a web page (as shown below) supplying information such as the platform on which the KHM will be run, the type of CPU, the kernel version number and a point of contact for the user. A user may also submit this information in many other forms such as by telephone, by facsimile, by electronic file transfer, etc. Once the official KHM has been built it is returned to the user via electronic mail.

FIG. 5 is an example of a web page request form 310. This example shows the user requesting an official KHM build. A user submits this form over the Internet and provides the type of KHM build request 312, the version of the software product that will use the KHM 314 (in this example, the SPLX software product), the name of the Linux distribution 316, the edition of that distribution 318, the kernel version 320, the CPU type 322, the CPU number 324 and a point of contact 326 for the person submitting the request.

To build a custom KHM the user fills out the request form (as shown below) and submits it to the system. The user also uploads his custom kernel header to the system, including all header files (that is, ".h files"). Once the custom KHM has been built it is returned to the user via electronic mail.

Figure 6:
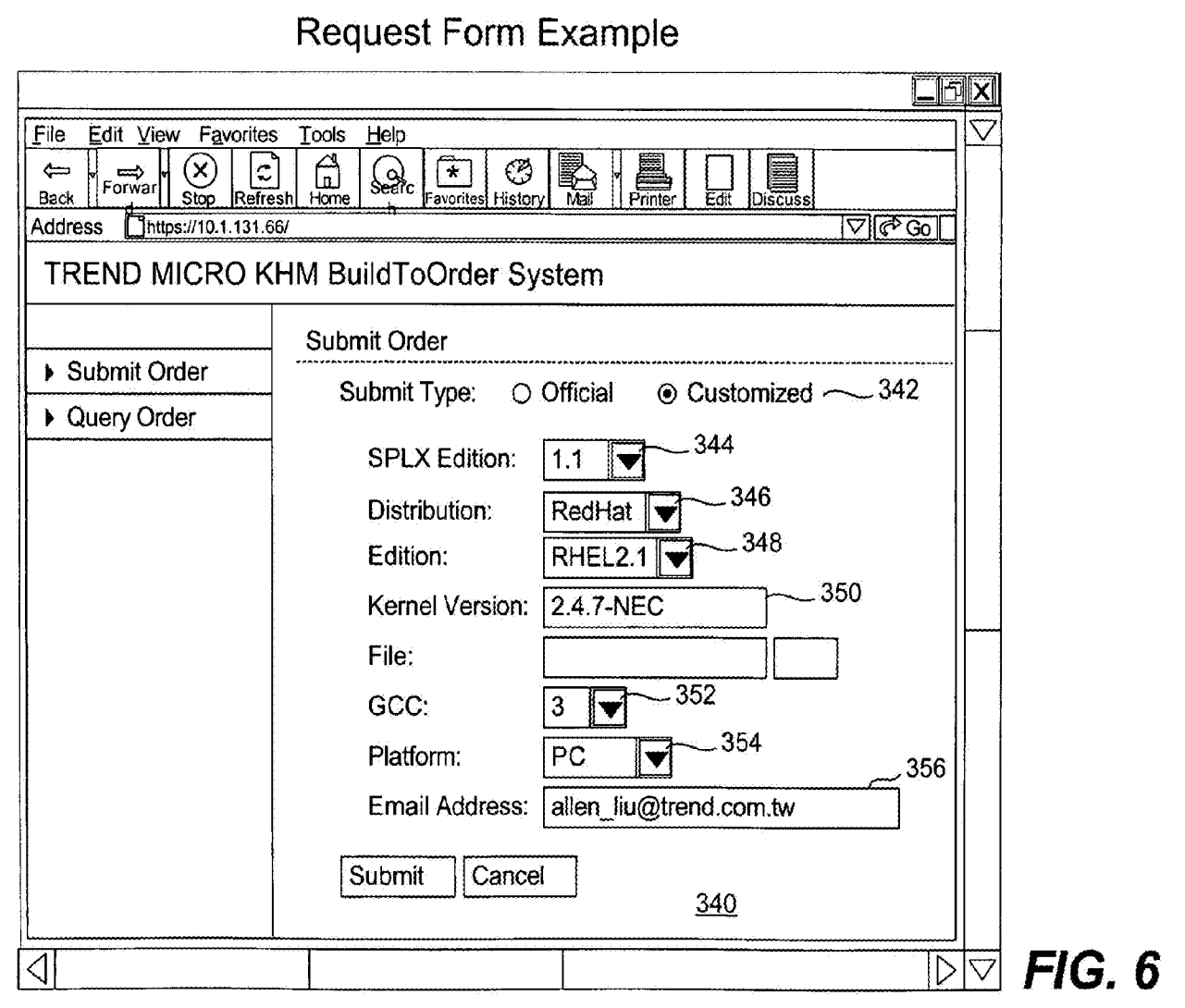

FIG. 6 is an example of a web page request form 340. This example shows the user requesting a custom KHM build. A user submits this form over the Internet and provides the type of KHM build request 342, the version of the software product that will use the KHM 344 (in this example, the SPLX software product), the name of the Linux distribution 346, the edition of that distribution 348, the kernel version 350, which compiler will be used 352 (in this example, a GNU C compiler), the type of platform 354 and a point of contact 356 for the person submitting the request.

Returning now to FIG. 4, the system proceeds to automatically build a KHM for the user as indicated at 230. Building of a KHM is explained in more detail below with reference to FIG. 8. The system may also perform unit testing of the newly built KHM as indicated at 240 before the KHM is returned to the user. A user may also enter a job identifier into a job query form available over the Internet to query the status of the user's submission request. A job identifier is returned to the user after the user finishes submitting a request.

A system administrator 260 can monitor the progress of build submissions and can start or stop the service arbitrarily for his convenience to maintain the system or to solve any problems reported within the system. Any exception report 270 that is created by the system when an error occurs is reported to the administrator via electronic mail.

Figure 7:
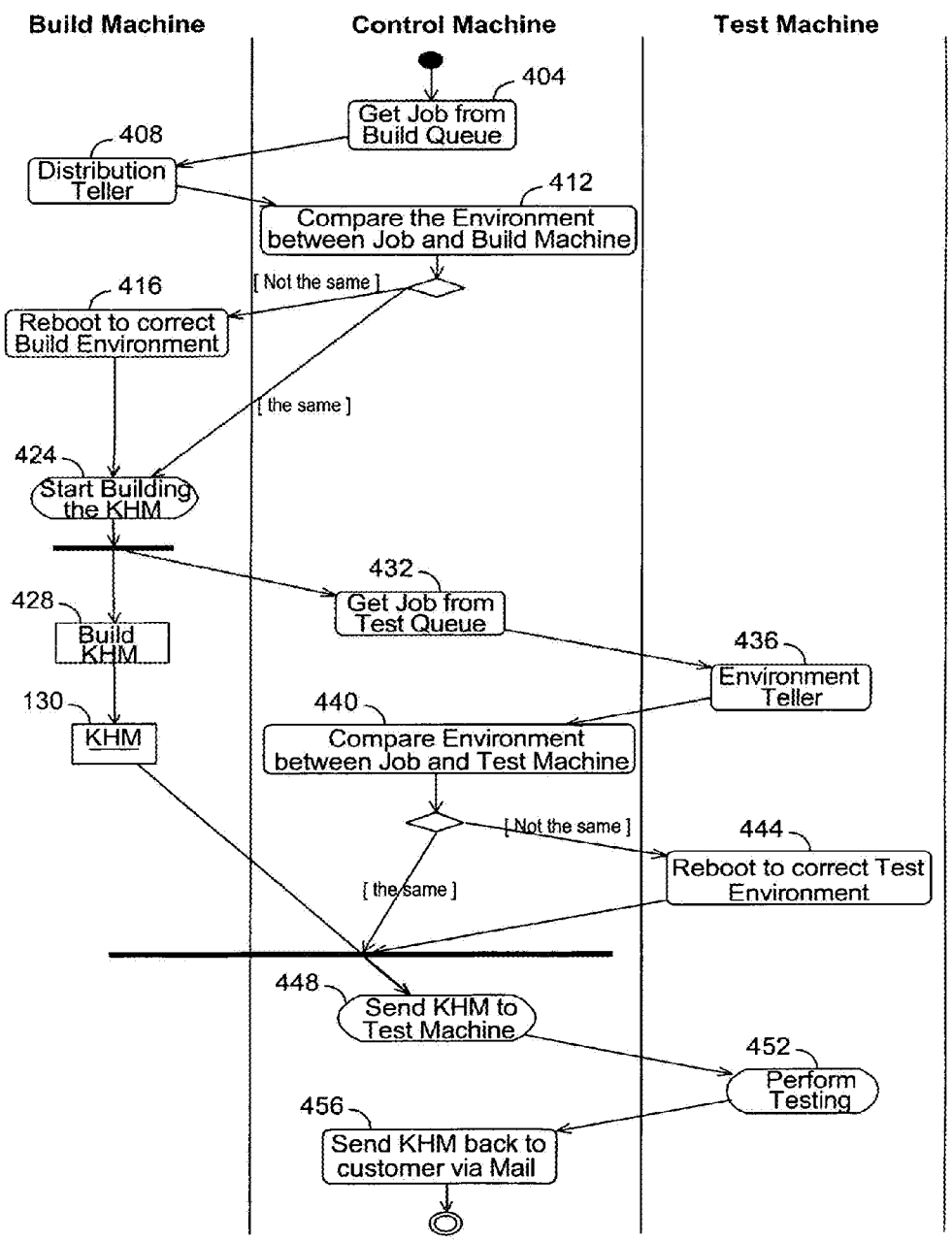
FIG. 7 is a machine flow diagram illustrating the flow of control between a build machine, a control machine and a unit test machine.

FIG. 7 is a machine flow diagram illustrating the flow of control between build machine 112, control machine 110 and unit test machine 114. When an end user submits a build request for a KHM those requests (or jobs) are placed into a build queue and are acted upon in order of submission. In step 404 the next job from the build queue is retrieved in preparation for a KHM to be built by the build machine. The build queue is useful in those embodiments in which there is only a single build machine. In other embodiments where there are multiple build machines, a build queue may not be necessary. In other embodiments the choice of which job to process next need not be based on time of arrival, but can be based on other criteria.

In step 408 the control machine queries a distribution teller of the build machine to determine which Linux distribution is currently running on the build machine. The distribution teller is a software program arranged to determine (and manipulate) which Linux distribution is currently running. Preferably, numerous Linux distributions are preinstalled upon the build machine such that a desired environment for building a KHM can be up and running in short order. In step 412 the control machine compares the Linux distribution environment needed by the current job with the distribution currently running on the build machine. For a build to be performed correctly, a KHM should be built in that Linux environment in which the KHM will eventually be used. If the two environments match, then control moves to step 424. If the environments do not match; then in step 416 the build machine is rebooted in order to run that Linux distribution needed by the current job. In an alternative embodiment, the build machine may not have a needed Linux distribution preinstalled or it may be too time-consuming to get the desired Linux distribution up and running on that machine. In this situation, the control machine may query other build machines to determine which build machine has the desired Linux distribution either preinstalled or currently running. The control machine can then transfer the current job to that other build machine.

In step 424 the KHM build process begins. In step 428 the build machine builds the KHM for the target distribution as is described below in more detail with reference to FIG. 8. Once the KHM 130 is built it is preferably tested on the test machine before delivery to the end user. In an alternative embodiment, it is not strictly necessary that the KHM be tested before delivery.

Once the build machine has created a new KHM it informs the control machine that a new KHM is ready for testing. Assuming that there is only a single test machine, the control machine creates a test queue to keep track of those KHMs ready for testing. In step 432 the control machine retrieves the next job from the test queue and communicates with the test machine. In other embodiments where a number of test machines are available, it may not be necessary to have a test queue, in which case the control machine may send a newly built KHM immediately to an available test machine.

In step 436 an environment teller of the test machine determines the Linux distribution environment currently running on the test machine and informs the control machine. In step 440 the control machine compares the target distribution needed by the current job with the environment on the test machine. If the environments do not match, then in step 444 the test machine is rebooted in order to install the correct Linux distribution environment. A correct distribution may be installed or test machines chosen as discussed above in order to match the correct environment. If the environments do match, then control moves from step 440 to step 448. In step 448 the control machine sends the newly built KHM to the test machine.

In step 452 the test machine inserts the KHM (that is, the KHM object file) into the Linux kernel and performs a variety of tests on the KHM. In one embodiment, a script file is used to run a number of tests. In the specific embodiment where the KHM is part of a larger software product that performs real-time scanning for viruses, one of the tests involves restarting the software product numerous times in order to stress the product and check its stability. Another test involves copying a computer virus (which results in both "open" and "close" system calls) to check and see whether the KHM functions correctly and intercepts the system calls. Other testing that may be performed includes volume testing and code coverage testing.

Finally, in step 456 the KHM object file is sent back to the requesting end user via electronic mail. Of course, the newly built KHM may be delivered to the end user using other techniques such as delivery via floppy disk through the mail, etc. In one embodiment a cryptographic technique is used to calculate a unique value for the KHM and that value is also delivered to the end user so that the end user can be assured that the KHM they receive is an exact copy of the one that was created on the build machine. For example, an MD5 for the KHM is calculated and is delivered to the end user as well. When the end user receives the KHM and inserts it into his or her kernel space the pointers in the system call table are replaced for those commands having replacements in the KHM, i.e., the pointers are replaced with the address of the new hook functions.

Automated KHM Build Process

Figure 8:
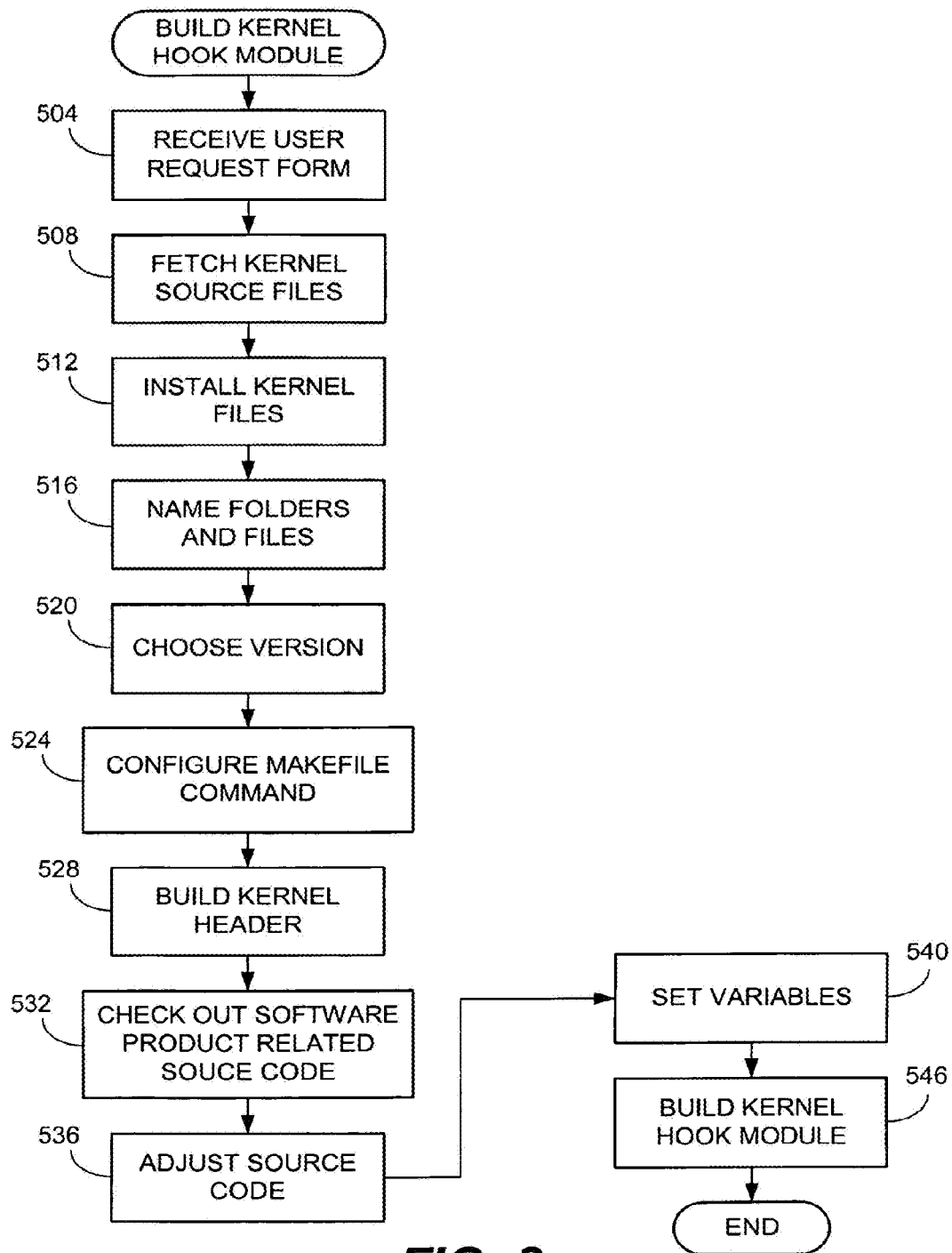
FIG. 8 is a flow diagram describing one embodiment by which a kernel hook module (KHM) is built.

FIG. 8 is a flow diagram describing one embodiment by which a kernel hook module (KHM) is built. The following steps (unless otherwise noted) are implemented on the build machine and are preferably embodied within a script file. Although the below steps can also be performed manually by an engineer, use of a script file allows the following process to be automated and occur much faster and with fewer errors. In one specific embodiment, the script file is written in the C++ programming language.

In step 504 the user request form previously submitted is received by the control machine and information regarding the target Linux distribution is relayed to the build machine. Unless already present, in step 508 the build machine fetches the kernel source files corresponding to the target Linux distribution. These are the kernel source files for a particular kernel version and include the "rpm" files as well as the header files. In one embodiment a real-time connection over the Internet is established with the web site of a company having the desired Linux distribution. For example, a connection is established with the Red Hat company in order to obtain a particular Red Hat Linux distribution. Alternatively, desired distributions have been previously downloaded to a cache on the control machine. In this situation, the kernel source files are fetched by simply transferring the desired source files from the control machine to the build machine. Of course, other automated techniques may also be used to obtain the source files.

In step 512 the kernel source files are installed by executing an "rpm" command on the build machine. In this embodiment, the kernel source files are fetched and installed onto the build machine even after the build machine is running the correct Linux distribution environment.

Steps 516, 520 and 524 all involve the setting of parameters to prepare for building of the KHM. Specific details on how these steps occur are provided below in the detailed example. In step 516 the various kernel folders and files are named appropriately. In step 520 the correct version for the compiler is chosen. In one embodiment the GNU C Compiler (GCC) is used. Commonly used versions of this compiler include GCC 2.96 and GCC 3.0. Depending upon the target distribution, one of these compiler versions is chosen in this step. In step 524 the "Makefile" command is configured. The makefile command typically consists of a file of information used to direct the compiling of the kernel source code. In this step it may be necessary to modify the default choice of GCC 2.96 to GCC 3.0 depending upon the target distribution. Also, depending upon the minor version number of the target distribution it may be necessary to make modifications to the Makefile.

In step 528 a number of commands are performed in order to prepare the kernel header and to resolve dependencies. These commands include: "make mrproper," "make clean," "make oldconfig," and "make dep."

Step 532 involves retrieving and linking in the actual KHM source code files that will be used during execution of the KHM to perform the tasks required. For example, if a KHM will be inserted into a Linux kernel in order to assist with real-time scanning of files for viruses, the actual source code that performs this real-time scanning is retrieved in this step. In a specific embodiment, a software product that uses a KHM to perform real-time virus scanning has its source code files stored in a revision control database. In this step, those source code files are checked out and made available to this build KHM process. Preferably, all of the source code files for the software product are made available, although in other embodiments it may only be necessary to check out those source code files that provide the specific KHM functionality. In step 536 it may be necessary to perform minor adjustments of the retrieved source code files depending upon the target Linux distribution. Of course, software products that perform functions other than real-time scanning for computer viruses may also be used in conjunction with the present invention as mentioned above.

In step 540 certain system environment variables are set depending upon the target Linux distribution. These environment variables are set to assist with the building of the KHM. In step 546 the KHM is built by invoking the "make" command that executes the contents of the Makefile. The result is an executable kernel hook module, that is, an object code file (or ".o" file) that is compatible with the target Linux distribution. The newly built KHM is then preferably tested before being delivered to the end user as described in the previous figure.

Sample KHM Build Instructions

The following presents specific instructions for how to automatically build a kernel hook module (KHM) for use with the Trend Micro software product ServerProtect for Linux (SPLX). In this example the KHM is being built for use with the Red Hat Linux distribution, version 2.4x. There are two basic phases, preparation of the kernel source code and building of the kernel modules. Preparation of the kernel source code generally involves four steps. First, the kernel source code is installed using the following commands:
    rpm -ivh kernel-source-<version>...rpm
    cd /usr/sre
tar czvf <tar-file-name> linux-<version>
    mv linux-<version> Linux-<Full version code>.<CPU type>

For Red Hat versions since 2.4.x, this final step may be skipped. Executing the command "cat /proc/sys/kernel/osrelease" provides the full version code of the current running kernel. This final step is used if one is building a KHM for different CPU types.

Secondly, two system "include" directories are moved and links are created to the specified kernel source tree by executing the following commands:
    cd /usr/include
    mv linux linux.org
    mv asm asm.org
    ln -s /usr/src/linux-<Full version code>.<CPU type>/include/linux linux
    ln -s /usr/src/linux-<Full version code>.<CPU type>/include/asm asm Thirdly, the following commands are used to move into the appropriate folder (the "ln" command is optional):
    cd /usr/src
    ln -s linux-<Full version code>.<CPU type> linux-<Full version code>
    cd linux-<Full version code>

For the "cd" command listed directly above, attach the characters "smp" to the tail if the kernel source tree is for Linux SMP (Linux for shared memory multiprocessor machines). E.g., for kernel 2.4.9-31, there will be /usr/src/linux-2.4.9-31 and /usr/src/linux-2.4.9-31smp. This modification is not suitable for SuSE Linux. Next, edit the Makefile as follows. Find the field EXTRAVERSION and for versions 2.4.9-31, set EXTRAVERSION to -31. For versions 2.4.9-31smp, set EXTRAVERSION to -31smp. Save the Makefile, exit the editor and then execute the following commands:

```
make mrproper ; make clean
cp configs/kernel-<Full version code>-i686.config ./.config
make oldconfig; make dep
chmod g+rw -R /usr/src
```

For a Linux SMP kernel module execute the following command instead of the above "cp" command:

```
cp configs/kernel-<version>-i686-smp.config ./.config
```

Note that the naming rules of configuration files are similar for Red Hat Linux, Turbo Linux and Miracle Linux, but not for SuSE Linux.

Fourthly, move the system include directories back by executing the following commands.

```
cd /usr/include
rm linux asm
mv linux.org linux
mv asm.org asm
```

After the above four steps have been completed the preparation of the kernel source code is done.

Following the first phase, preparation of the kernel source code, the next phase is the building of the kernel modules. Building (or compiling) of the kernel module involves two steps, preparing the source code and compiling the kernel module. As mentioned above, in this specific embodiment, a kernel hook module (KHM) is used in conjunction with, and part of, a software product from Trend Micro called "SPLX" that can perform real-time virus scanning in addition to other functions. To prepare the SPLX source code the following commands are executed:

```
cd <user-home>
mkdir <src-dir>
cd <src-dir>
```

Note that for the first command the user must belong to the root group and that the third command provides access to a directory from where the source code will be checked out. Also, the files <src-dir>/source/modules and <src-dir>/source/common/include/splx.h are needed in order to build the KHM.

The compilation of the kernel module is performed in different fashions depending upon with which version of the software product SPLX the module will be used. For SPLX version 1.1 the following commands are executed:

```
cd <src-dir>/source/module
add 'uname -r' in Makefile
export DIST=<platform>
make
```

The kernel modules are then created in the location: <user-home>/<src-dir>/module/bin/splxmod-<Full version code>. Note that in the third command the value of <platform> is specific to whether the distribution is for Red Hat, Turbo, Miracle or SuSE.

For SPLX version 1.1 NEC NAS the following commands are executed:

```
cd <src-dir>/source/module
add 'uname -r' in Makefile
export DIST=RedHat PLATFORM=NAS VENDOR=NEC
make
```

The kernel modules are then created in the location:
<user-home>/<src-dir>/module/bin/splxmod-<Full version code>.

For SPLX version 1.2, 1.25 or 1.3 the following commands are executed:

```
cd <src-dir>/source/module
add 'uname -r' in. Makefile
export DIST=<platform> DISTV=<see below >
make (splx 1.1/1.2/1.25)
make modules (splx 1.3)
```

The kernel modules are then created in the location: <user-home>/<src-dir>/module/bin/splxmod-<Full version code>. Note that in the third command the value of <platform> is specific to whether the distribution is for Red Hat, Turbo, Miracle or SuSE. Also, note that the value of DISTV depends on the GCC version and the kernel structure. For example, GCC and p_pptr implies RedHat, GCC version 3 and p_pptr implies RedHat8, and GCC version 3 and p_parent implies RedHat9.

KHM Build Example

The following is a specific example showing how to build a KHM for use with the Linux distribution Red Hat version 2.4.9-31. Once the user logs in as the "root" the following commands are executed:

```
rpm -ivh kernel-source-2.4.9-31.i386.rpm
cd /usr/src
tar czvf 2.4.9-31.tar.gz linux-2.4.9-31
mv Linux-2.4.9-31 linux-2.4.9-31smp.i686
tar xzvf 2.4.9-31.tar.gz
mv linux-2.4.9-31 linux-2.4.9-31.i686
```

Now the source trees for Linux UP and Linux SMP are created. The dependencies for Linux UP are made by executing the following:

```
cd /usr/include
mv linux linux.org
mv asm asm.org
ln -s /usr/src/linux-2.4.9-31.i686/include/linux linux
ln -s /usr/src/linux-2.4.9-31.i686/include/asm asm
cd /usr/src
ln -s linux-2.4.9-31.i686 linux-2.4.9-31
cd linux-2.4.9-31
<modify the field EXTRAVERSION Makefile>
make mrproper ; make clean
cp configs/kernel-2.4.9-i686.config ./.config
make oldconfig; make dep
```

The dependencies for Linux SMP are made by executing the following:

```
cd /usr/include
rm linux asm
ln -s /usr/src/linux-2.4.9-31smp.i686/include/linux linux
ln -s /usr/src/linux-2.4.9-31smp.i686/include/asm asm
cd /usr/src
ln -s linux-2.4.9-31smp.i686 linux-2.4.9-31smp
cd linux-2.4.9-31 smp
<modify the field EXTRAVERSION Makefile>
make mrproper ; make clean
cp configs/kernel-2.4.9-i686-smp.config ./.config
make oldconfig; make dep
chmod g+rw -R /usr/src
cd /usr/include
rm linux asm
mv linux.org linux
mv asm.org asm
```

Next, login as a user belonging to the root group and execute the following (note that the location "<src-dir>" is the location from which the source code is checked out):

```
cd <user-home>
mkdir <src-dir>
cd <src-dir>
cd <user-home>/<src-dir>/source/module
export DIST=RedHat
make
```
The kernel modules will be created in the location: <user-home>/<src-dir>/module/bin/splxmod-2.4.9-31.o and in the location splxmod-2.4.9-31smp.o.

Notes for Particular Distributions

The following are notes regarding specific techniques for supporting particular Linux distributions. For example, to support Red Hat version 8.0 note the following regarding the GCC. Currently, the kernels for Red Hat version 8.0 (which is kernel 2.4.18-13 or above) are compiled with GCC version 3.0, therefore one must compile KHMs for Red Hat version 8.0 with GCC version 3. But, the build machine of SPLX 1.1 uses Red Hat version 7.2, which contains GCC version 2.96. Therefore GCC version 3-3.0.4-1 should be installed in the build machine. Further, one must modify the file of kernel source code as follows before making dependencies. First, modify the line HOSTCC=gcc -> HOSTCC=gcc3. Secondly, modify the lineCC=$(CROSS_COMPILE)gcc -> CC=$ (CROSS_COMPILE)gcc3.

In order to support Red Hat Enterprise Linux (RHEL) the "modutil" package must be upgraded. The default "modutil" package cannot be used to build a kernel source for RHEL. In order to support SuSE Linux please note the following. There are two different kinds of SuSE kernel packages—the old style and the new style. The old style can have a discrepancy between its package name and its real kernel name. For example, after installing package "k_smp-2.4.19-113.i586.rpm," you can get kernel "2.4.21-64 GB-SMP." The new style is very similar to Red Hat; in other words, the package name is the same as the kernel name. Utilize the following to understand both the new style example and the old style example that are listed below.

```
    Put kernel-source.rpm into /
    rpm2cpio kernel-source-2.4.21-151.i586.rpm > kernel-source-2.4.21-151.cpio
    cat kernel-source-2.4.21-151.cpio || cpio -idvm
    The new style example is listed below.
    cd /usr/src
    tar czvf linux-2.4.21-151.tgz linux-2.4.21-151
    mv linux-2.4.21-151 linux-2.4.21-151-default
    cd /usr/include/
    ln -s /usr/src/linux-2.4.21-151-default/include/asm-i386 asm
    ln -s /usr/src/linux-2.4.21-151-default/include/linux linux
    cd /usr/src/linux-2.4.21-151-default/
    vi Makefile
    EXTRAVERSION=-151-default
    HOSTCC=/opt/experimental/bin/gcc
    CC=/opt/experimental/bin/$(CROSS_COMPILE)gcc
    make mrproper;make clean
    cp ../ linux-2.4.21-151-include/default/.config .config
    make oldconfig;make dep;
    The old style example is listed below.
    cd /usr/src
    tar czvf linux-2.4.20.SuSE-340.tgz linux-2.4.20.SuSE
    mv linux-2.4.20.SuSE linux-2.4.20-4 GB
    cd /usr/include
    ln -s /usr/src/linux-2.4.20-4 GB/include/linux linux
    ln -s /usr/src/linux-2.4.20-4 GB/include/asm-i386 asm
    cd /usr/src/linux-2.4.20-4 GB/
    vi Makefile
    EXTRAVERSION=
    HOSTCC=/opt/experimental/bin/gcc
    CC=/opt/experimental/bin/$(CROSS_COMPILE)gcc
    make mrproper;make clean;
    cp vmilnuz.config /usr/src/linux-2.4.20-4 GB/.config
    make oldconfig;make dep
    cd /usr/include
    rm linux asm
    mv linux.org linux
    mv asm.org asm
```
The following is a real example for SuSE Linux, broken down into nine general steps.
```
(1) rpm2cpio kernel-source-2.4.19.SuSE-340.i586.rpm > kernel-source-2.4.19.SuSE-340.i586.cpio
    mv kernel-source-2.4.19.SuSE-340.i586.cpio /trap/
(2) cat /tmp/kernel-source-2.4.19.SuSE-340.i586.cpio || cpio -idvm
(3) cd /usr/src
    mv linux-2.4.19. SuSE SLES/linux-2.4.19-340-64 GB-SMP
    ln -s linux-2.4.19-64 GB-SMP SLES/linux-2.4.19-340-64 GB-SMP/
(4) cd /usr/include/
    ln -s /usr/src/linux-2.4.19-64 GB-SMP/include/linux linux
    ln -s /usr/src/linux-2.4.19-64 GB-SMP/include/asm asm
(5) cd /usr/src/linux-2.4.19-64 GB-SMP
    vi Makefile
    VERSION=2
    PATCHLEVEL=4
    SUBLEVEL=19
    EXTRAVERSION=
    HOSTCC=/opt/experimental/bin/gcc
    CC=/opt/experimental/bin/S(CROSS_COMPILE)gcc
(6) make mrproper;make clean
(7) cp vmlinuz.config .config
(8) Make oldconfig;make dep
(9) cd /usr/include
    rm linux asm
    mv linux.org linux
    mv asm.org asm
```

Computer System Embodiment

Figure 9A:
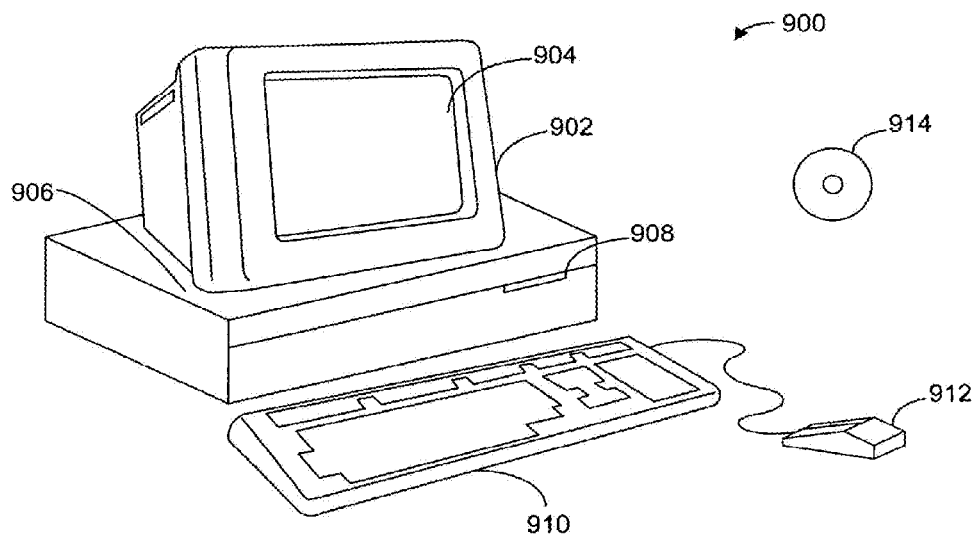
FIGS. 9A and 9B illustrate a computer system suitable for implementing embodiments of the present invention.
Figure 9B:
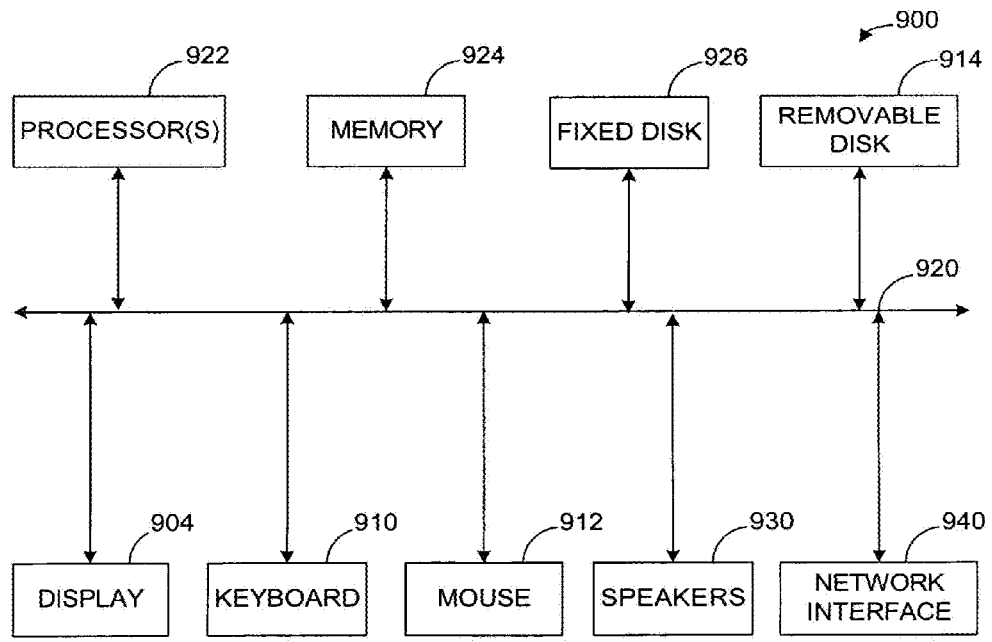

FIGS. 9A and 9B illustrate a computer system 900 suitable for implementing embodiments of the present invention. FIG. 9A shows one possible physical form of the computer system. Of course, the computer system may have many physical forms ranging from an integrated circuit, a printed circuit board and a small handheld device up to a huge super computer. Computer system 900 includes a monitor 902, a display 904, a housing 906, a disk drive 908, a keyboard 910 and a mouse 912. Disk 914 is a computer-readable medium used to transfer data to and from computer system 900.

FIG. 9B is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary storage medium (such as a hard disk) that is slower than primary storage. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher level code that are executed by a computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

We claim:

1. A method of automating the building of a kernel hook module (KHM), said method comprising:
    receiving a user request to build said KHM, said user request including information identifying a particular operating system distribution environment;
    determining whether a build machine is currently running said requested particular operating system distribution environment in response to said user request;
    when it is determined that said build machine is not currently running said requested particular operating system distribution environment, rebooting said build machine in order to run said requested particular operating system distribution environment;
    running said particular operating system distribution environment on said build machine in response to said user request;
    retrieving kernel source files corresponding to said operating system distribution environment;
    installing said kernel source files on said build machine;
    building said KHM on said build machine in an automated manner; and
    delivering said KHM to said user, whereby said user inserts said KHM into said particular operating system distribution environment.

2. The method as recited in claim 1 further comprising:
    running said operating system distribution environment on a test machine;
    transferring said KHM to said test machine from said build machine; and
    testing said KHM on said test machine, whereby the stability of said KHM is tested.

3. The method as recited in claim 1 further comprising:
    receiving said user request at a control machine, said control machine directing operation of said build machine.

4. The method as recited in claim 1 wherein said user request is a request to build an official KHM or a request to build a custom KHM.

5. The method as recited in claim 1 further comprising:
    receiving with said user request information identifying a software product with which said KHM functions;
    building said KHM on said build machine in an automated manner using source files of said software product, whereby said KHM allows functionality of said software product to operate in said operating system distribution environment.

6. The method as recited in claim 5 wherein said functionality of software product includes anti-virus functionality.

7. The method as recited in claim 1 wherein said step of building said KHM is performed using a script file to automate said building.

8. The method as recited in claim 1 wherein said operating system distribution environment is a Linux operating system.

9. The method as recited in claim 1 wherein said KHM is able to function properly within said particular operating system distribution environment and not in other operating system distribution environments.

10. A system for automating the building of a kernel hook module (KHM), said system comprising:
    a user request form including information identifying a particular operating system distribution environment, said user request form being received from a user desiring a KHM;
    a build machine running said operating system distribution environment in response to said user request form and including kernel source files corresponding to said operating system distribution environment, said build machine being arranged to build said KHM in an automated manner, wherein said build machine being further arranged to determine whether said build machine is currently running said requested particular operating system distribution environment in response to said user request and to reboot in order to run said requested particular operating system distribution environment in response to said user request when it is determined that said build machine is not currently running said requested particular operating system distribution environment;
    a control machine in communication with the Internet and with said build machine, said control machine directing operation of said build machine; and a kernel hook module (KHM) having been built on said build machine, said KHM being compatible with said operating system distribution environment, whereby said KHM is delivered to said user for insertion into said operating system distribution environment.

11. The system as recited in claim 10 further comprising:
a test machine running said operating system distribution environment; and
a testing facility on said test machine for testing said KHM on said test machine.

12. The system as recited in claim 10 wherein said build machine and said control machine are the same machine.

13. The system as recited in claim 10 wherein said user request form includes a request to build an official KHM or includes a request to build a custom KHM.

14. The system as recited in claim 10 further comprising:
source files of a software product, wherein said user request form identifies said software product, and wherein said build machine is further arranged to build said KHM in an automated manner using said source files of said software product, whereby said KHM allows functionality of said software product to operate in said operating system distribution environment.

15. The system as recited in claim 14 wherein said functionality of software product includes anti-virus functionality.

16. The system as recited in claim 10 wherein said operating system distribution environment is a Linux operating system.

17. The system as recited in claim 10 wherein said KHM is able to function properly within said operating system distribution environment and not in other operating system distribution environments.

18. A method of building a kernel hook module (KHM) in an automated manner, said method comprising:
receiving information identifying a particular operating system distribution environment;
determining whether a build machine is currently running said requested particular operating system distribution environment in response to said received information;
when it is determined that said build machine is not currently running said requested particular operating system distribution environment, rebooting said build machine in order to run said requested particular operating system distribution environment;
running said particular operating system distribution environment on said a build machine in response to said received information;
receiving kernel source files on said build machine corresponding to said operating system distribution environment;
setting parameters to enable said KHM to be built;
obtaining source code representing functionality of said KHM; and
building, on said build machine, said KHM in an automated manner using said kernel source files, said parameters and said source code to produce an object file for use in said operating system distribution environment.

19. The method as recited in claim 18 for the comprising:
receiving information indicating that said KHM is a custom KHM; and
receiving custom kernel header files to be used in said step of building said KHM, whereby said KHM is a custom KHM for an end user.

20. The method as recited in claim 18 further comprising:
receiving information identifying a software product with which said KHM functions;
receiving source files of said software product; and
performing said step of building said KHM in an automated manner using said source files, whereby said KHM allows functionality of said software product to operate in said operating system distribution environment.

21. The method as recited in claim 20 wherein said functionality of software product includes anti-virus functionality.

22. The method as recited in claim 18 wherein said steps of said method are performed using a script file to automate said method.

23. The method as recited in claim 18 wherein said operating system distribution environment is a Linux operating system.

24. The method as recited in claim 18 wherein said KHM is able to function properly within said particular operating system distribution environment and not in other operating system distribution environments.

25. A non-transitory computer-readable storage medium comprising computer code for building a kernel hook module (KHM) in an automated manner, said computer code of said computer-readable storage medium effecting the following:
receiving information identifying a particular operating system distribution environment;
determining whether a build machine is currently running said requested particular operating system distribution environment in response to said received information;
when it is determined that said build machine is not currently running said requested particular operating system distribution environment, rebooting said build machine in order to run said requested particular operating system distribution environment;
running said particular operating system distribution environment on said build machine in response to said received information;
receiving kernel source files on said build machine corresponding to said operating system distribution environment;
setting parameters to enable said KHM to be built;
obtaining source code representing functionality of said KHM; and
building, on said build machine, said KHM in an automated manner using said kernel source files, said parameters and said source code to produce an object file for use in said operating system distribution environment.

26. A non-transitory computer-readable storage medium as recited in claim 25 wherein said operating system distribution environment is a Linux operating system.

27. A non-transitory computer-readable storage medium as recited in claim 25 wherein said KHM is able to function properly within said particular operating system distribution environment and not in other operating system distribution environments.

* * * * *